US012548880B2

(12) United States Patent
Huangfu et al.

(10) Patent No.: US 12,548,880 B2
(45) Date of Patent: Feb. 10, 2026

(54) HEATABLE RADOME STRUCTURE OF AUTOMOBILE, AND PRODUCTION METHOD THEREFOR

(71) Applicants: NINGBO SHINTAI MACHINES CO., LTD., Ningbo (CN); NINGBO MINTH AUTOMOTIVE PARTS RESEARCH & DEVELOPMENT CO., LTD., Ningbo (CN)

(72) Inventors: Lexiao Huangfu, Ningbo (CN); Zhiguo Ma, Ningbo (CN); Lifeng Xie, Ningbo (CN); Haixing Tong, Ningbo (CN); Chen Li, Ningbo (CN); Bing Chen, Ningbo (CN); Zhuozhi Liu, Ningbo (CN); Guoqiang Ye, Ningbo (CN)

(73) Assignees: NINGBO SHINTAI MACHINES CO., LTD., Ningbo (CN); NINGBO MINTH AUTOMOTIVE PARTS RESEARCH & DEVELOPMENT CO., LTD., Ningbo (CN)

( * ) Notice: Subject to any disclaimer, the term of this patent is extended or adjusted under 35 U.S.C. 154(b) by 919 days.

(21) Appl. No.: 17/753,606

(22) PCT Filed: Sep. 8, 2020

(86) PCT No.: PCT/CN2020/114037
§ 371 (c)(1),
(2) Date: Mar. 9, 2022

(87) PCT Pub. No.: WO2021/047509
PCT Pub. Date: Mar. 18, 2021

(65) Prior Publication Data
US 2022/0320706 A1  Oct. 6, 2022

(30) Foreign Application Priority Data
Sep. 11, 2019 (CN) .......................... 201910860939.8

(51) Int. Cl.
*H01Q 1/02* (2006.01)
*B29C 45/14* (2006.01)
(Continued)

(52) U.S. Cl.
CPC ................. *H01Q 1/02* (2013.01); *H01Q 1/32* (2013.01); *H01Q 1/42* (2013.01); *H05B 3/34* (2013.01)

(58) Field of Classification Search
CPC .......... H01Q 1/3233; H01Q 1/02; H01Q 1/42; H01Q 1/32; H05B 3/34; B29C 45/14; B29C 69/00; G01S 7/02
(Continued)

(56) References Cited

U.S. PATENT DOCUMENTS

| 4,572,430 A * | 2/1986 | Takagi ............... B60H 1/00285 |
| | | 219/202 |
| 2009/0056660 A1* | 3/2009 | Goto ...................... F23Q 7/001 |
| | | 123/145 A |

(Continued)

FOREIGN PATENT DOCUMENTS

| CN | 208385631 U | 1/2019 |
| CN | 110635241 A | 12/2019 |

(Continued)

OTHER PUBLICATIONS

International Search Report dated Dec. 2, 2020 from corresponding PCT Application No. PCT/CN2020/114037.

*Primary Examiner* — Eric S Stapleton
(74) *Attorney, Agent, or Firm* — INNOVATION CAPITAL LAW GROUP, LLP; Vic Lin (57) ABSTRACT

Provided is a heatable radome structure of an automobile. The structure comprises a diaphragm, a heating wire, and a front cover plate, wherein the heating wire is provided with a coating, and the heating wire with the coating is printed on (Continued)

the diaphragm according to a set layout so as to form an integral heating diaphragm member. The heating diaphragm member comprises a main body portion and a bending area portion, wherein the main body portion is arranged on a front surface of the front cover plate; and the bending area portion is arranged on one side of a rear end of the front cover plate after being bent, a conductive sheet electrically connected to the heating wire is welded to the bending area portion, and a connector is connected to the conductive sheet.

11 Claims, 7 Drawing Sheets

(51) Int. Cl.
*B29C 69/00* (2006.01)
*G01S 7/02* (2006.01)
*H01Q 1/32* (2006.01)
*H01Q 1/42* (2006.01)
*H05B 3/34* (2006.01)

(58) Field of Classification Search
USPC .................................................. 219/202–209
See application file for complete search history.

(56) References Cited

U.S. PATENT DOCUMENTS

| | | | |
|---|---|---|---|
| 2012/0055913 A1* | 3/2012 | Huang | F24H 9/1827 |
| | | | 219/202 |
| 2013/0068748 A1* | 3/2013 | Csonti | H05B 3/20 |
| | | | 219/202 |

FOREIGN PATENT DOCUMENTS

| | | | | |
|---|---|---|---|---|
| CN | 210692753 U | 6/2020 | | |
| DE | 102014002438 A1 | 8/2015 | | |
| EP | 1122744 A1 * | 8/2001 | ............ | G21F 5/005 |
| WO | 2019065165 A1 | 4/2019 | | |

* cited by examiner

HEATABLE RADOME STRUCTURE OF AUTOMOBILE, AND PRODUCTION METHOD THEREFOR

TECHNICAL FIELD

The present invention belongs to the technical field of auto parts, and in particular relates to a heatable radome structure of an automobile and a production method thereof.

BACKGROUND OF THE INVENTION

The surface of the radome of the automobile is prone to being frozen in cold weather. It is quite necessary to take measures to remove the ice layer on the surface of the radome in order to guarantee radar waves penetrate the radome effectively. The scheme of the existing heatable radome structure of automobiles on the market is as follows: the heating wire is welded to the diaphragm according to a set layout, where the end portion of the heating wire and the diaphragm and the plastic are subject to insert molding to form the outer plate; it is guaranteed that two sides of the heating sides in the opened area are exposed so as to weld the conductive sheet with the heating wire together during injection molding; and the outer plate is bonded to the diaphragm by using the sealant and the inner plate with the connector and the outer plate are bonded together, and the chromium-plated is clamped on the outermost side of the label to shield the sealed hole. It may be seen that the radome of the structure is integrally complex in structure, complex in steps, and high in integral manufacturing cost.

BRIEF SUMMARY OF THE INVENTION

Aiming at the current situation in the prior art, the present invention provides a heatable radome structure of an automobile and a production method thereof. Compared with a current volume production scheme, the structure has the advantages of simple steps, high binding force of the front and rear cover plates, and low cost.

A technical scheme adopted by the present invention to solve the abovementioned technical problems is as follows: a heatable radome structure of an automobile includes a diaphragm, a heating wire, and a front cover plate, where the heating wire is provided with a coating, and the heating wire with the coating is printed on the diaphragm according to a set layout so as to form an integral heating diaphragm member, the structure being characterized in that the heating diaphragm member comprises a main body portion and a bending area portion, wherein the main body portion is arranged on a front surface of the front cover plate; and the bending area portion is arranged on one side of a rear end of the front cover plate after being bent, a conductive sheet electrically connected to the heating wire is welded to the bending area portion, and a connector is connected to the conductive sheet.

In the heatable radome structure of an automobile, the bending area portion is provided with a conductive mounting hole, and one end of the conductive sheet penetrates through the conductive mounting hole and is electrically connected with the heating wire in the diaphragm.

In the heatable radome structure of an automobile, a place where one side of the rear end of the front cover plate is matched with the bending area portion is provided with a bending assembly member, the bending assembly member and the front cover plate are formed by integral injection molding, the bending assembly member includes an abutting portion on the diaphragm, the abutting portion on the diaphragm includes a salient point, the bending area portion is provided with a positioning hole matched with the salient point, a middle position of the abutting portion on the diaphragm is provided with a notch, and the connector is connected to the conductive sheet and stretches out from the notch.

In the heatable radome structure of an automobile, the bending assembly member further includes glue overflow grooves, where the glue overflow grooves are formed in two sides of the abutting portion on the diaphragm, a plurality of lateral separation members are arranged at a lower end side of the abutting portion on the diaphragm at an interval, a lateral groove is formed between two adjacent lateral separation members, and the glue overflow grooves are communicated with the lateral grooves.

In the heatable radome structure of an automobile, an end portion of the heating wire printed in the diaphragm according to the layout is provided with a close winding structure, a closing winding direction of the close winding structure being a longitudinal direction.

In the heatable radome structure of an automobile, an ensemble consisting of the diaphragm, the heating wire, the front cover plate, the conductive sheet and the connector forms an integrated member with a connector of a rear cover plate by injection molding.

In the heatable radome structure of an automobile, the connector is provided with a copying block, the copying block is provided with two pinholes, and the connector penetrates through the pinholes.

In the heatable radome structure of an automobile, a bottom of the connector is provided with a protruding structure matched with the copying block.

In the heatable radome structure of an automobile, the heatable radome structure of an automobile further includes the rear cover plate, the rear cover plate is integrally provided with an electric connection connector by injection molding, and the connector is assembled together with the electric connection connector after being integrally embedded and injected with the copying block.

A production method of a heatable radome structure of an automobile, characterized in that the heatable radome structure of an automobile is comprised of the following steps:
  S1, welding a heating wire with a coating to a back of a printed diaphragm according to a set layout;
  S2, molding the diaphragm treated in S1 in a high pressure molding device to form an integral heating diaphragm and cutting the heating diaphragm;
  S3, placing the molded heating diaphragm member in an IML die to form a front cover plate by injection molding and forming a bending assembly member together by injection molding;
  S4, forming a conductive mounting hole in an end of the bending area portion of the heating diaphragm member and welding a conductive sheet;
  S5, bending the bending area portion of the heating diaphragm member to a rear end of the front cover plate and abutting the bending area portion against the bending assembly member;
  S6, assembling the connector to the bending assembly member via hot melting or bonding;
  S7, injecting glue from glue overflow grooves of the bending assembly member, wherein the glue flows into a lateral groove, so that a lateral portion of the bending area portion of the diaphragm is bonded to a lower lateral portion of the bending assembly member; and S8, then placing the front cover plate in a rear cover plate die for insert injection molding.

In the production method of the heatable radome structure of an automobile, an end portion of the heating wire in S1 is designed to be a close winding structure, a closing winding direction of the close winding structure being a longitudinal direction.

In the production method of the heatable radome structure of an automobile, in S2, it is necessary to reserve the bending area portion when the heating diaphragm member is cut.

Compared with the prior art, the present invention has the advantages that the heating diaphragm is provided with the bending area portion, the welding structure may be prevented from being exposed via a bending process, the shielding structure is removed, and the connector and the label body are connected more firmly by means of the insert injection molding process. Compared with the scheme in the prior art, the structure has the advantages of simplicity, high binding force of the front and rear cover plates, and low cost.

DETAILED DESCRIPTION OF THE INVENTION

Specific embodiments of the present invention are described below, and further description on the technical scheme of the present invention is made below in combination with the drawings. The present invention is not limited to the embodiments.

In the drawings, diaphragm 1; heating wire 2; front cover plate 3; main body portion 4; bending area portion 5; conductive mounting hole 6; conductive sheet 7; close winding structure 8; connector 9; bending assembly member 10; abutting portion 11 on the diaphragm; salient point 12; positioning hole 13; notch 14; glue overflow groove 15; lateral separation member 16; lateral groove 17; copying block 18; pinhole 19; protruding structure 20; rear cover plate 21; electric connection connector 22.

Figure 1:
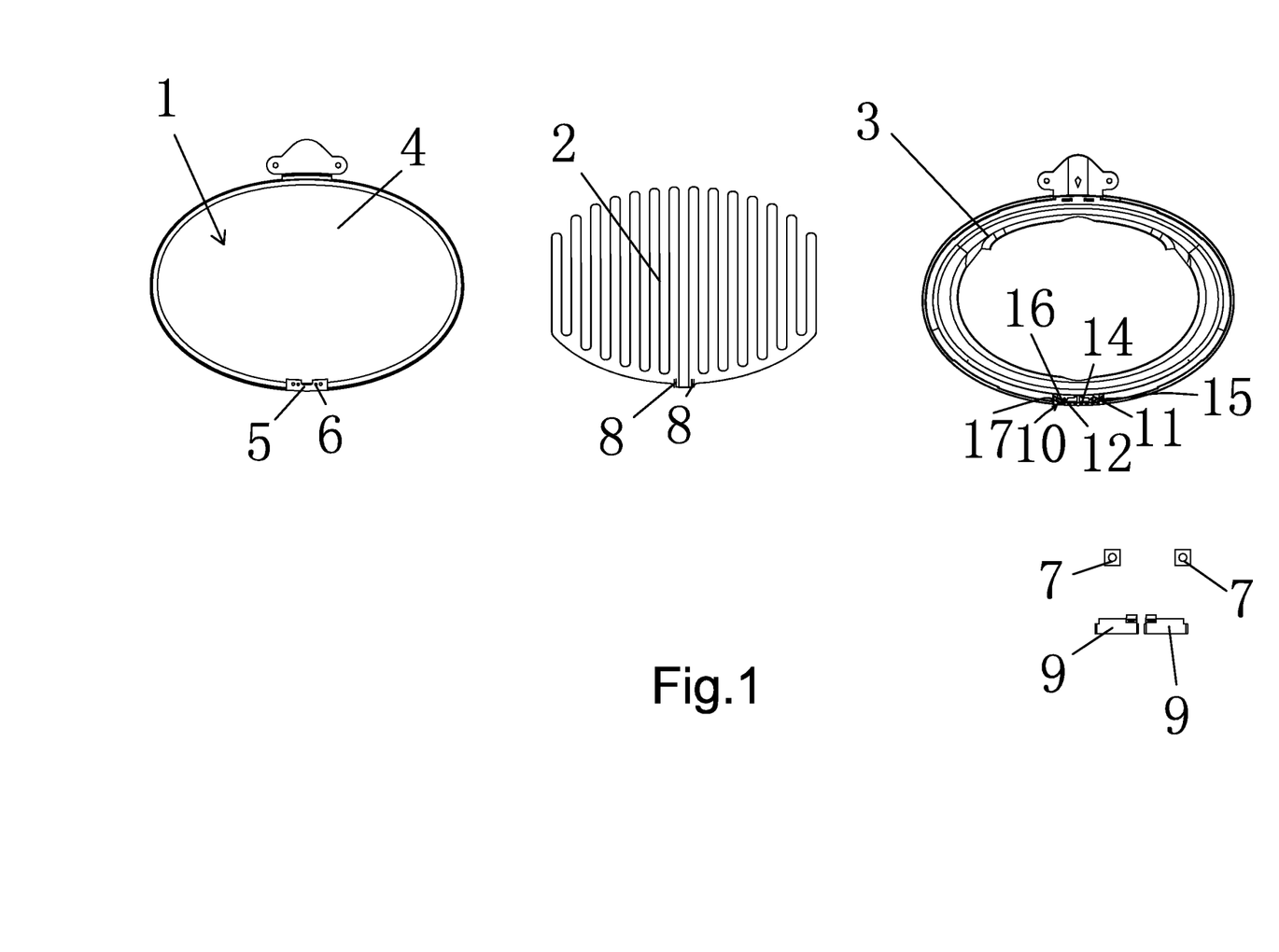
FIG. 1 is an integral schematic diagram of a breakdown structure of a heatable radome structure of an automobile.
Figure 2:
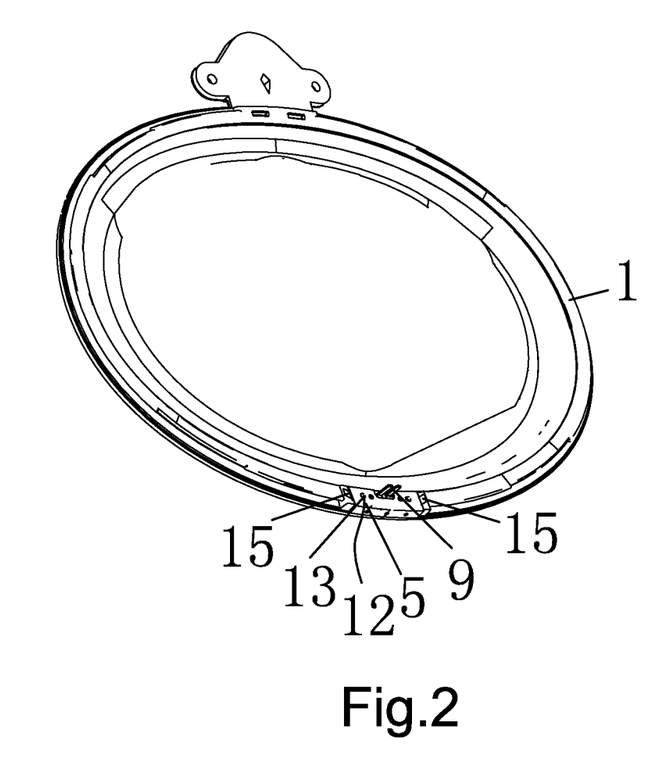
FIG. 2 is a three-dimensional structural schematic diagram of the structure assembled in FIG. 1.

As shown in FIG. 1 and FIG. 2, the heatable radome structure of an automobile includes a diaphragm 1, a heating wire 2, and a front cover plate 3, where the heating wire 2 is provided with a coating, and the heating wire 2 with the coating is printed on the diaphragm 1 according to a set layout so as to form an integral heating diaphragm member. The heating wire 2 mainly plays a role of heating to remove the ice layer on the surface of the radome so as to guarantee that radar waves penetrate through the radome. The heating wire 2 is additionally provided with a coating to better protect the heating wire 2. The heating diaphragm member includes a main body portion 4 and a bending area portion 5, where the main body portion 4 is arranged on a front surface of the front cover plate 3, and the bending area portion 5 is arranged on one side of a rear end of the front cover plate 3 after being bent. The greatest innovative point of the patent is as follows: the bending area portion 5 is reserved on the integral heating diaphragm member and is directly bent to one side of the rear end of the front cover plate 3 by means of a bending process, so that the welding structure may be prevented from being exposed. The shielding structure is removed, a conductive sheet 7 electrically connected to the heating wire 2 is welded to the bending area portion 5, and a connector 9 is connected to the conductive sheet 7. As the conductive sheet 7 is electrically connected with the heating wire 2 in the conductive sheet, the heating wire 2 heats after the connector 9 is electrically connected.

Figure 3:
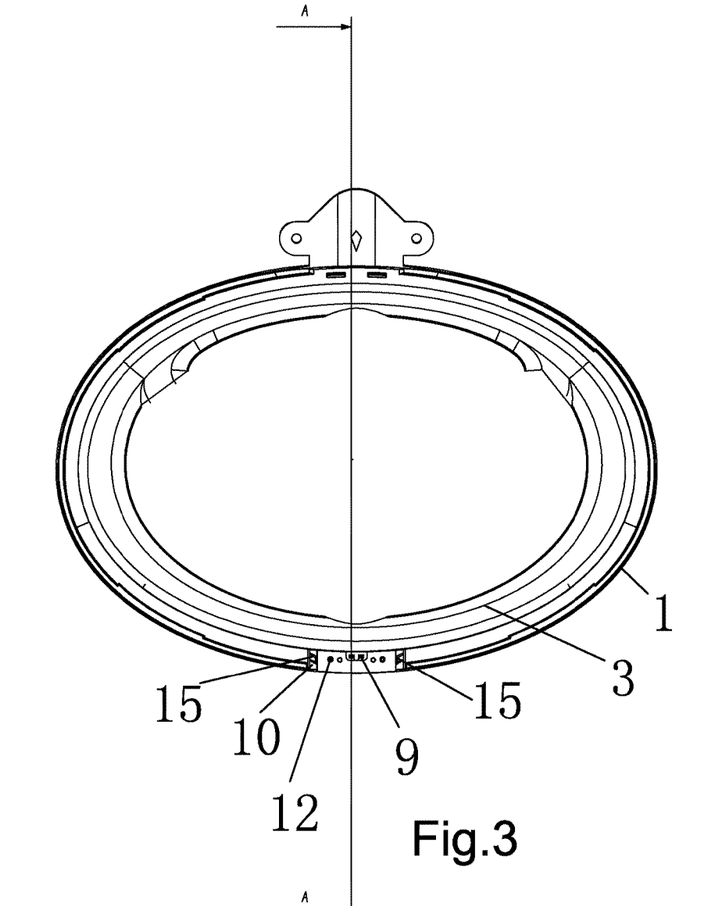
FIG. 3 is a main view structural schematic diagram of FIG. 1.
Figure 4:
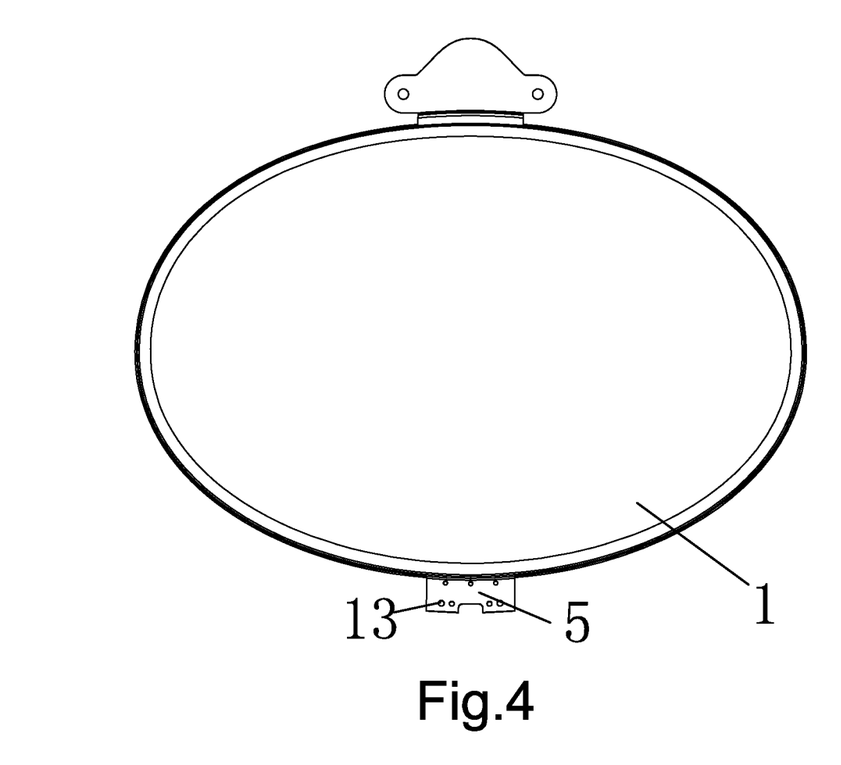
FIG. 4 is a structural schematic diagram of a diaphragm.
Figure 5:
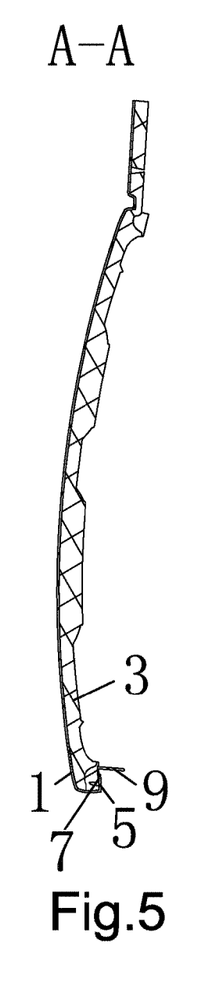
FIG. 5 is an A-A direction structural schematic diagram of FIG. 3.

As shown in FIG. 3, FIG. 4, and FIG. 5, as an optimization, in order to facilitate electric connection of the whole bending area portion 5, the bending area portion 5 is provided with a conductive mounting hole 6, and one end of the conductive sheet 7 penetrates through the conductive mounting hole 6 and is electrically connected with the heating wire 2 in the diaphragm 1. Penetrating through the conductive mounting hole 6 is equivalent to punching the surface layer of the diaphragm 1, so that it is convenient for the conductive sheet 7 to penetrate through the surface layer of the diaphragm 1 to be electrically connected with the heating wire 2 in the conductive sheet 7. Thus, the heating effectiveness of the heating wire 2 is guaranteed. As shown in FIG. 3, in order for more full electric contact of the heating wire 2, an end portion of the heating wire 2 printed in the diaphragm 1 according to the layout is provided with a close winding structure 8, a closing winding direction of the close winding structure 8 being a longitudinal direction, so that the conductive contact area is increased. Therefore, as long as the conductive sheet 7 is connected with one heating wire 2, heating may be realized. The reliability of the connecting end is guaranteed. An ensemble consisting of the diaphragm 1, the heating wire 2, the front cover plate 3, the conductive sheet 7, and the connector 9 forms an integrated member with an insert of a rear cover plate by injection molding. The connector 9 and the label body are connected more firmly by means of the insert injection molding process, so that the whole product is better in reliability.

In order to facilitate fixing and mounting of the bending area portion 5, a place where one side of the rear end of the front cover plate 3 is matched with the bending area portion 5 is provided with a bending assembly member 10, the bending assembly member 10 and the front cover plate are formed by integral injection molding, the bending assembly member 10 includes an abutting portion 11 on the diaphragm, the abutting portion 11 on the diaphragm includes a salient point 12, the bending area portion 5 is provided with a positioning hole 13 matched with the salient point 12, and therefore, the bending area portion 5 on the diaphragm may be pressed to the salient point 12 to be initially positioned via the positioning hole 13. In addition, the bending assembly member 10 further includes glue overflow grooves 15, where the glue overflow grooves 15 are formed in two sides of the abutting portion 11 on the diaphragm, a plurality of lateral separation members 16 are arranged at a lower end side of the abutting portion 11 on the diaphragm at an interval, a lateral groove 17 is formed between two adjacent lateral separation members 16, and the glue overflow grooves 15 are communicated with the lateral grooves 17. After the bending area portion 5 on the diaphragm is pressed to the salient point 12 to be initially positioned via the positioning hole 13, glue flows to the lateral grooves 17 via the glue overflow grooves 15, so that the lateral grooves 17 are filled with the glue, and therefore, the bending area portion 5 and the bending assembly member 10 are fixed together. In addition, a middle position of the abutting portion 11 on the diaphragm is provided with a notch 14, and the connector 9 is connected to the conductive sheet 7 and stretches out from the notch 14, so that it is convenient to mount and extract the connector subsequently.

Figure 6:
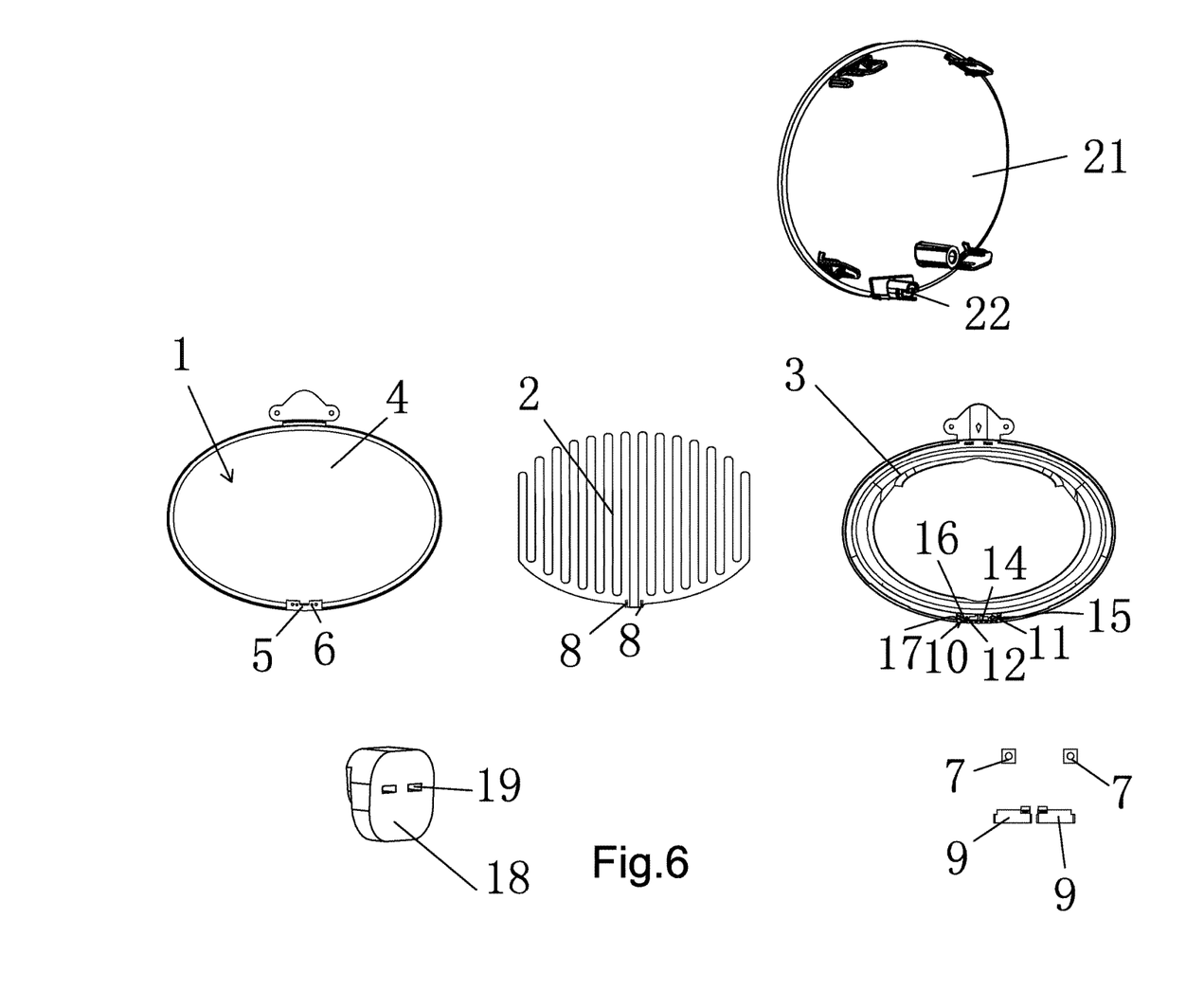
FIG. 6 is a structural schematic diagram of the structure in addition with a copying block and a rear cover plate in FIG. 1.
Figure 7:
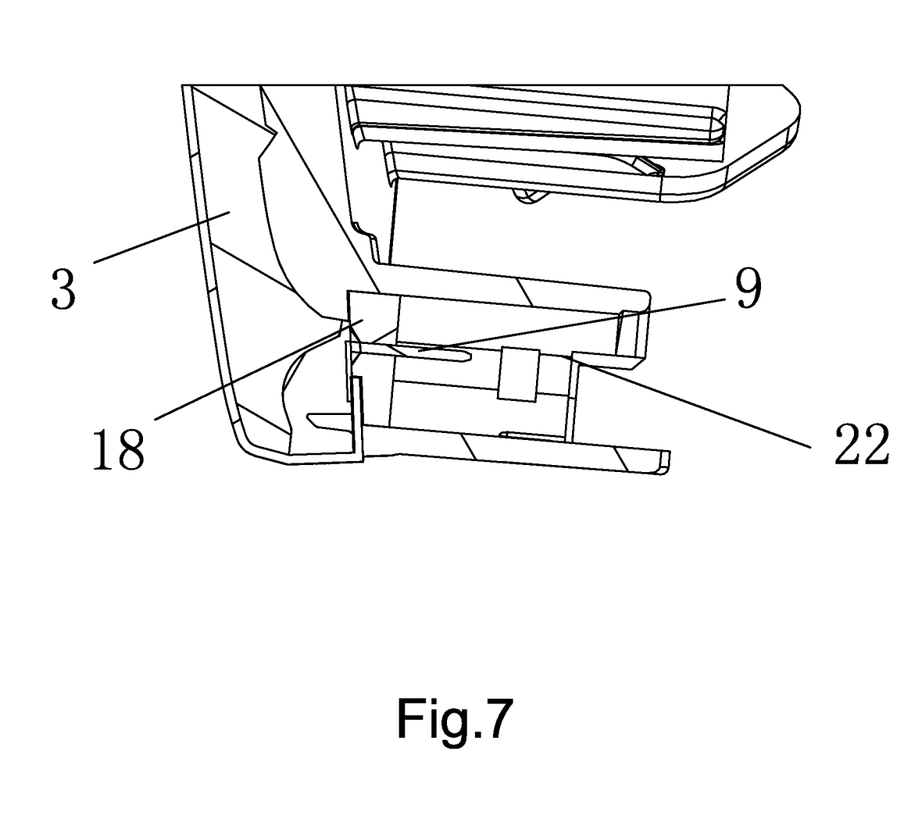
FIG. 7 is a matched structural schematic diagram of a front cover plate, a copying block, and an electric connection connector.

As shown in FIG. 6 and FIG. 7, the connector 9 is provided with a copying block 18, the copying block 18 is provided with two pinholes 19, and the connector 9 penetrates through the pinholes 19. The sealing structure of a pedestal insert injection mold may be simplified effectively by means of the structure of the copying block 18, and meanwhile, a glue leaking risk is avoided. The copying block is preferably a material with better compatibility with the material of the front cover plate, the material including but not limited to materials such as AES, ABS, and ASA. The bottom of the connector 9 is provided with a protruding structure 20 matched with the copying block 18, and the protruding structure 20 may guarantee that the copying block 18 is not prone to gliding from the front cover plate 3. The heatable radome structure of the automobile further includes a rear cover plate 21, the rear cover plate 21 is integrally provided with an electric connection connector 22 by injection molding, and the connector 9 is assembled together with the electric connection connector 22 after being integrally embedded and injected with the copying block 18. Thus, the whole heatable radome fits together, and it is convenient to perform control connection within the automobile via the electric connection connector 22.

The radome structure of the patent is primarily manufactured by the following steps: S1, a heating wire with a coating is welded to a back of a printed diaphragm 1 according to a set layout, where an end portion of the heating wire is designed to be a close winding structure 8, a closing winding direction of the close winding structure 8 being a longitudinal direction; S2, the diaphragm treated in S1 is molded in a high pressure molding device to form an integral heating diaphragm member and the heating diaphragm member is cut, where it is necessary to reserve the bending area portion 5 when the heating diaphragm member is cut; S3, the molded heating diaphragm member is placed in an IML die to form a front cover plate 3 by injection molding; S4, a conductive mounting hole 6 is formed in an end of the bending area portion 5 of the heating diaphragm member, and a conductive sheet 7 is welded; S5, the bending area portion of the heating diaphragm member is bent to a rear end of the front cover plate 3 and the bending area portion 5 is abutted against the bending assembly member 10; S6, the connector 9 is assembled to the bending assembly member 10 via hot melting or bonding; S7, glue is injected from glue overflow grooves 15 of the bending assembly member 10, where the glue flows into a lateral groove 17, so that a lateral portion of the bending area portion 5 of the diaphragm is bonded to a lower lateral portion of the bending assembly member 10; and S8, then the front cover plate 3 is placed in a rear cover plate die for insert injection molding. Compared with the scheme in the prior art, the radome structure manufactured by the above steps has the advantages of simple steps, high binding force of the front and rear cover plates, and low cost.

The specific embodiments described herein are merely illustrations of the spirit of the present invention. Various modifications or supplements can be made on the described specific embodiments or can be replaced in a similar manner by those skilled in the art without deviating from the scope defined by the spirit of the present invention.

What is claimed is:

1. A heatable radome structure of an automobile, the structure comprising a diaphragm, a heating wire, and a front cover plate, wherein the heating wire is provided with a coating, and the heating wire with the coating is welded on the diaphragm according to a set layout so as to form a heating diaphragm member, the structure being characterized in that the heating diaphragm member comprises a main body portion and a bending area portion, wherein the main body portion is arranged on a front surface of the front cover plate; and the bending area portion is arranged on one side of a rear end of the front cover plate after being bent, a conductive sheet electrically connected to the heating wire is welded to the bending area portion, and a connector is connected to the conductive sheet; and a place where one side of the rear end of the front cover plate is matched with the bending area portion, the bending area portion is provided with a bending assembly member, the bending assembly member and the front cover plate are formed by integral injection molding, the bending assembly member comprises an abutting portion on the diaphragm, the abutting portion on the diaphragm comprises a salient point, the bending area portion is provided with a positioning hole matched with the salient point, a middle position of the abutting portion on the diaphragm is provided with a notch, and the connector is connected to the conductive sheet and stretches out from the notch.

2. The heatable radome structure of an automobile according to claim 1, characterized in that the bending area portion is provided with a conductive mounting hole, and one end of the conductive sheet penetrates through the conductive mounting hole and is electrically connected with the heating wire in the diaphragm.

3. The heatable radome structure of an automobile according to claim 1, characterized in that the bending assembly member further comprises glue overflow grooves, wherein the glue overflow grooves are formed in two sides of the abutting portion on the diaphragm, a plurality of lateral separation members are arranged at a lower end side of the abutting portion on the diaphragm at an interval, a lateral groove is formed between two adjacent lateral separation members, and the glue overflow grooves are communicated with the lateral grooves.

4. The heatable radome structure of an automobile according to claim 3, characterized in that an end portion of the heating wire printed in the diaphragm according to the layout is provided with a close winding structure, a closing winding direction of the close winding structure being a longitudinal direction.

5. The heatable radome structure of an automobile according to claim 4, characterized in that an ensemble consisting of the diaphragm, the heating wire, the front cover plate, the conductive sheet and the connector forms an integrated member with a connector of a rear cover plate by injection molding.

6. The heatable radome structure of an automobile according to claim 5, characterized in that the connector is provided with a copying block, the copying block is provided with two pinholes, and the connector penetrates through the pinholes.

7. The heatable radome structure of an automobile according to claim 6, characterized in that a bottom of the connector is provided with a protruding structure matched with the copying block.

8. The heatable radome structure of an automobile according to claim 7, characterized in that the heatable radome structure of an automobile further comprises the rear cover plate, the rear cover plate is integrally provided with an electric connection connector by injection molding, and the connector is assembled together with the electric connection connector after being integrally embedded and injected with the copying block.

9. A production method of a heatable radome structure of an automobile, characterized in that the heatable radome structure of an automobile according to claim 5 is comprised of the following steps:
   S1, welding the heating wire with the coating to a back of the diaphragm according to a set layout;
   S2, molding the diaphragm treated in S1 in a high pressure molding device to form the heating diaphragm member, and cutting the heating diaphragm member;
   S3, placing the heating diaphragm member in an IML die to form the front cover plate by injection molding and forming the bending assembly member together by injection molding;
   S4, forming a conductive mounting hole in an end of the bending area portion of the heating diaphragm member and welding the conductive sheet;
   S5, bending the bending area portion of the heating diaphragm member to the rear end of the front cover plate and abutting the bending area portion against the bending assembly member;
   S6, assembling the connector to the bending assembly member via hot melting or bonding;
   S7, injecting glue from the glue overflow grooves of the bending assembly member, wherein the glue flows into the lateral groove, so that a lateral portion of the bending area portion of the heating diaphragm member is bonded to a lower lateral portion of the bending assembly member; and
   S8, then placing the front cover plate in a rear cover plate die for insert injection molding.

10. The production method of the heatable radome structure of an automobile according to claim 9, characterized in that the end portion of the heating wire in S1 is designed to be the close winding structure, the closing winding direction of the close winding structure being a longitudinal direction.

11. The production method of the heatable radome structure of an automobile according to claim 9, characterized in that in S2, it is necessary to reserve the bending area portion when the heating diaphragm member is cut.

* * * * *